US010049144B2

(12) United States Patent
Laxminarayanan

(10) Patent No.: US 10,049,144 B2
(45) Date of Patent: Aug. 14, 2018

(54) ASSOCIATIVE OBJECT MODEL FOR COMPOSITE ENTITY INFORMATION

(75) Inventor: Venkatesh Laxminarayanan, Ashburn, VA (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 13/450,252

(22) Filed: Apr. 18, 2012

(65) Prior Publication Data

US 2012/0239700 A1 Sep. 20, 2012

Related U.S. Application Data

(63) Continuation of application No. 11/968,372, filed on Jan. 2, 2008, now Pat. No. 8,190,646.

(51) Int. Cl.
 *G06F 17/30* (2006.01)
(52) U.S. Cl.
 CPC .............................. *G06F 17/30575* (2013.01)
(58) Field of Classification Search
 USPC ........................................................ 707/792
 See application file for complete search history.

(56) References Cited

U.S. PATENT DOCUMENTS

| | | | | |
|---|---|---|---|---|
| 5,603,024 | A | * | 2/1997 | Goldring ........................ 707/615 |
| 6,061,692 | A | * | 5/2000 | Thomas ............ G06F 17/30362 |
| | | | | 707/613 |
| 6,735,593 | B1 | * | 5/2004 | Williams |
| 6,959,268 | B1 | * | 10/2005 | Myers, Jr. et al. ............... 703/6 |
| 6,961,687 | B1 | * | 11/2005 | Myers et al. ...................... 703/6 |
| 2003/0182234 | A1 | * | 9/2003 | Degroot ................. G06Q 30/04 |
| | | | | 705/51 |
| 2004/0024790 | A1 | * | 2/2004 | Everett ........................ 707/200 |
| 2005/0114711 | A1 | * | 5/2005 | Hesselink ........... H04L 63/0209 |
| | | | | 726/4 |
| 2006/0212767 | A1 | * | 9/2006 | Agazzani ............... G06Q 10/06 |
| | | | | 714/731 |
| 2009/0320035 | A1 | * | 12/2009 | Ahlgren et al. .............. 718/104 |

\* cited by examiner

*Primary Examiner* — Charles D Adams
(74) *Attorney, Agent, or Firm* — John Pivnichny; Andrew M. Calderon; Roberts Mlotkowski Safran Cole & Calderon, P.C.

(57) ABSTRACT

An associative object model for presenting composite entity information is provided. More particularly, a system and method of linking various data related to an entity from isolated databases in a distributed enterprise is provided. The system and method presents composite information on the entity to different systems within the distributed enterprise. The method includes propagating a change of data of a first entity type to one or more related or associated entity types in an active associative object model (AOM) accessible by a subscribing system and a publishing system in an enterprise.

18 Claims, 8 Drawing Sheets

ASSOCIATIVE OBJECT MODEL FOR COMPOSITE ENTITY INFORMATION

CROSS REFERENCE TO RELATED APPLICATIONS

The present application is a continuation application of co-pending U.S. application Ser. No. 11/968,372, filed on Jan. 2, 2008, the contents of which are incorporated by reference in its entirety herein.

FIELD OF THE INVENTION

The invention relates to an associative object model for presenting composite entity information and, more particularly, to a system and method of linking various data related to an entity from isolated databases in a distributed enterprise and presenting composite information on the entity to different systems within the distributed enterprise.

BACKGROUND OF THE INVENTION

An enterprise system includes many different subscribing and publishing systems, each having access to their own databases. In traditional publish/subscribe mechanisms, publishers can assign one or more topics to a message and each subscriber to that topic receives the message.

It is known that subscribers which can readily avail information from existing services of publishers in the enterprise are the best serviced; whereas, subscribers that require receiving information from existing services in order to compute their end information have an overhead as they resort to traditional and sequential processing techniques. Alternatively, new services publishing the information required by such subscribers will have to be created.

In traditional systems, if required information is not readily available, subscribers in the enterprise may often store intermediary information to derive end information from the available information. Also, the end information derived by the subscriber may be of future interest to other systems in the enterprise.

However, individual enterprise systems often have to replicate data to accommodate these scenarios. The redundant information through the enterprise has to be synchronized to maintain consistent information. Synchronizing the redundant information introduces latency, obstructing from achieving a real time enterprise. Also, data standardization of varying and replicated data becomes difficult. Thus, the inability to allow subscribers to access and manipulate information introduces limitations on enterprise agility, process simplification and compatibility.

Accordingly, there exists a need in the art to overcome the deficiencies and limitations described hereinabove.

SUMMARY OF THE INVENTION

In a first aspect of the invention, a method comprises propagating a change of data of a first entity type to one or more related or associated entity types in an active Associative Object Model (AOM) accessible by a subscribing system and a publishing system in an enterprise.

In another aspect of the invention, a system comprises a computer infrastructure operable to propagate changes throughout linked objects in an active Associative Object Model (AOM) accessible by a subscribing system and a publishing system in the enterprise. The computer infrastructure is also operable to publish a single, synchronized and integrated master view of the linked objects with the change.

In still another aspect of the invention, a computer program product comprises a computer usable medium having readable program code embodied in the medium. The computer program product includes at least one component to provide the processes of the invention.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention generally relates to an Associative Object Model (AOM) for presenting composite entity information and, more particularly, to a system and method of linking various data of an entity from isolated databases in a distributed enterprise and presenting composite information on the entity to systems within the distributed enterprise. An entity can be one or more entities and hence contain one or more objects. In implementing the system and method of the invention, information of the entity can be linked in an AOM such that a change to the entity by any system within the enterprise propagates through the AOM by virtue of reference to the point of change. In this manner, all systems within the enterprise that have subscribed to the entity will instantly be able to observe the change to the entity in a highly normalized fashion such that no redundant actions or data is required to fully realize a change in the entity. This eliminates redundant data within the entire enterprise, as well as reduces overhead of the subscribers to existing services. Thus, the subscribers will no longer need to compute their end information, as would be in traditional and sequential processing techniques.

System Environment

Figure 1:
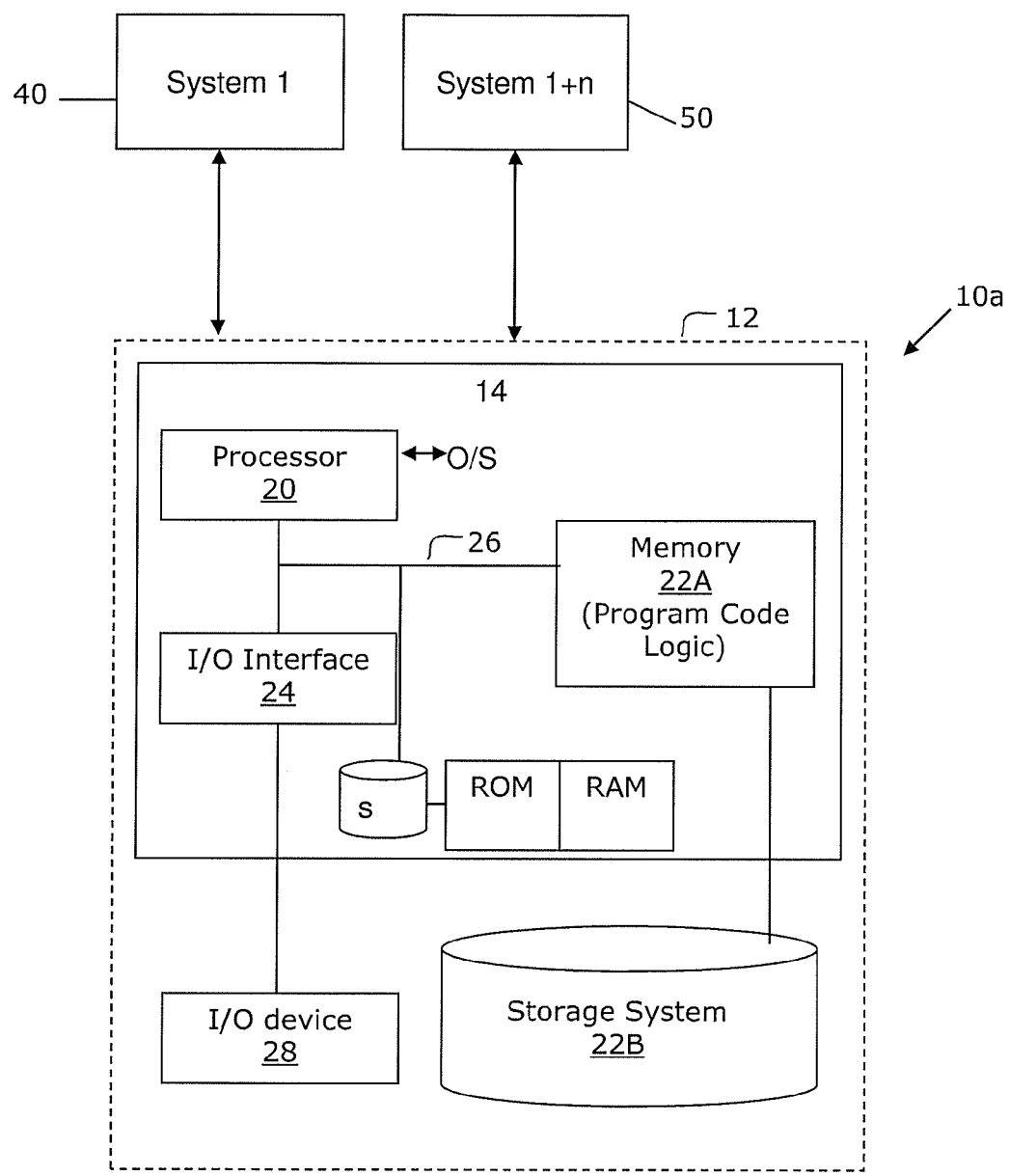
FIG. 1 shows an illustrative environment for implementing the processes in accordance with the invention.

FIG. 1 shows an illustrative environment 10 for managing the processes in accordance with the invention. The environment 10 includes a computer infrastructure 12 that can perform the processes described herein. The computer infrastructure 12 includes a computing device 14 that is operable to build an AOM from silos of data from isolated databases to represent an object's comprehensive, enterprise-wide and real-time state. More specifically, the computing device 14, implementing an AOM schema, can automatically propagate a change in one entity in the AOM to other related or associated entity through the AOM. In this way, the AOM can publish a single, synchronized and integrated master view of an entity. Advantageously, this allows subscribers to view a master view of an entity without the need for additional computing overhead.

The computing device 14 is in communication with a storage system 22B. The storage system 22B can be a database that tabulates and stores the objects and associated attributes of the AOM, as well as provides links. As should be understood, the entity could contain one or more entities and hence one or more objects. The objects, in turn, could contain one or more attributes. Links can describe the following associations:

(i) if an entity contains more than one object then the relationship amongst the objects;

(ii) if an entity contains other entities then the relationship to other entities; and (iii) if an entity is shared by one or more systems in the distributed environment then this subscription information.

By providing such links, it is possible to propagate a change to an attribute of the object through a plurality of objects within the AOM and also to a plurality of systems within the distributed environment. In the storage system 22B, attributes can be added to existing objects, new objects can be added and one to one, one to many and many-to-many associations amongst the objects can be accommodated. The storage system 22B is accessible by subscribers and/or publishers.

Further, the computing device 14 includes a processor 20, a memory 22A, an input/output (I/O) interface 24, an external I/O device/resource 28 and a bus 26. The I/O device 28 can comprise any device that enables an individual to interact with the computing device 14 or any device that enables the computing device 14 to communicate with one or more other computing devices using any type of communications link. The bus 26 provides a communications link between each of the components in the computing device 14.

The processor 20 executes computer program code (e.g., embodied on software), which is stored in memory 22A and/or storage system 22B. The computer program code includes the processes of the invention as discussed herein. While executing computer program code, the processor 20 can read and/or write data to/from memory 22A, storage system 22B, and/or I/O interface 24.

In embodiments, a computer program product accessible from a computer-usable or computer-readable medium provides the program code. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RAN) and DVD. In each embodiment, the program code and hardware can be created using standard programming and engineering techniques, respectively.

It is understood that the computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code.

Similarly, the computer infrastructure 12 is only illustrative of various types of computer infrastructures for implementing the invention. For example, in embodiments, the computer infrastructure 12 comprises two or more computing devices (e.g., a Client/Server) that communicate over any type of communications link, such as a network, a shared memory, or the like, to perform the process described herein. Further, while performing the processes described herein, one or more computing devices in the computer infrastructure 12 can communicate with one or more other computing devices 40, 50 external to computer infrastructure 12 using any type of communications link. The computing devices 40, 50 can be representative of either one or multiple publishing or subscribing systems. The communications link can comprise any combination of wired and/or wireless links; any combination of one or more types of networks (e.g., the Internet, a wide area network, a local area network, a virtual private network, etc.); and/or utilize any combination of transmission techniques and protocols.

A service provider can create, maintain, deploy and support the infrastructure and/or program code described in FIG. 1. The service provider, such as a Solution Integrator, could offer to perform the processes described herein for payment from customer(s) under a subscription and/or fee agreement and/or the service provider can receive payment from the sale of advertising content to one or more third parties.

Associative Object Model (AOM) and Composite Entity (Object) Information (CEI)

The AOM is a platform to build Composite Entity Information (CEI). For example, the CEI is built from associating silos of data on an entity from isolated databases to represent the entity's comprehensive, enterprise-wide and real-time state. Thus, in implementation, when a document conforming to the AOM is instantiated and populated with attributes of an entity, a CEI for the entity can be formed in accordance with the invention.

Figures 2A, 2B:
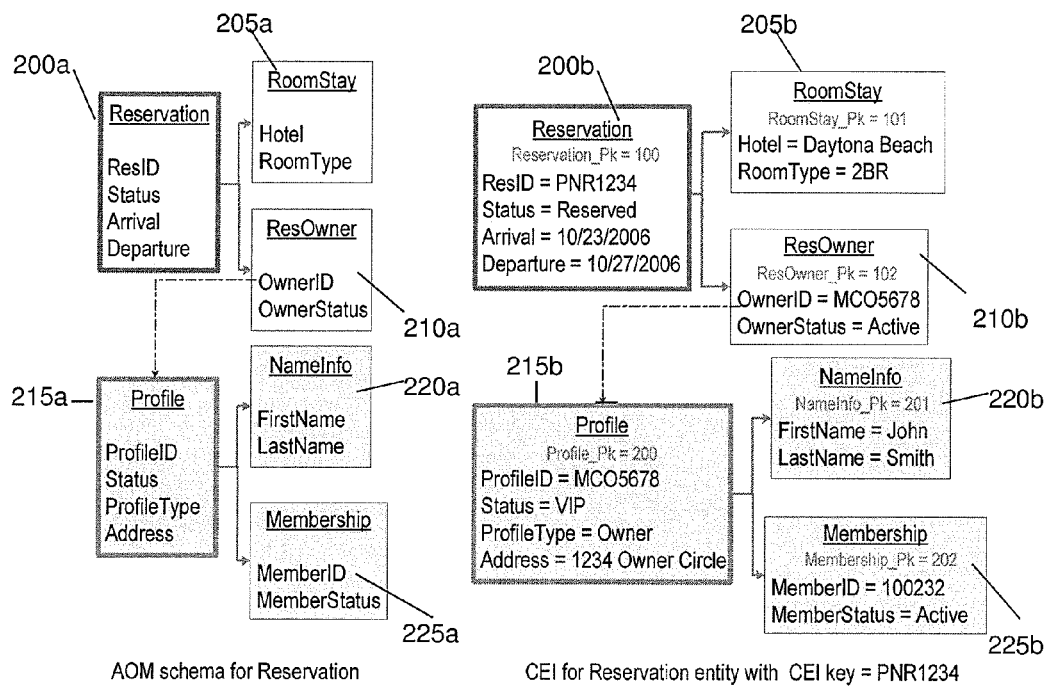
FIGS. 2a and 2b show examples of an Associative Object Model (AOM) schema in accordance with an aspect of the invention.

FIGS. 2a and 2b show examples of an AOM schema for "Reservation". Those of ordinary skill in the art should understand that the AOM schema shown in FIGS. 2a and 2b is merely illustrative of the invention and that other schemas are contemplated by the invention, all of which do not depart from the scope and spirit of the present invention. For example, the AOM schema may be made from any established industry specific standard example such as, for example, HITIS (Hospitality Industry Technology Integration standards) or HL7 (Health Level Seven). Thus, the AOM itself is agnostic to the underlying industry.

In embodiments, the AOM is configured to be oblivious to underlying industry specific schema and, accordingly, can be implemented to spawn across organizations with different industry specific standards. Moreover, as the AOM is oblivious of the underlying industry specific schema, no industry specific intelligence is required for functioning of the AOM.

In FIG. 2a, objects 200a, 205a, 210a, 215a, 220a, 225a have unpopulated attributes contained in the "Reservation" AOM; whereas, FIG. 2b depicts a Reservation AOM being instantiated and populated with attributes as in objects 200*b*, 205*b*, 210*b*, 215*b*, 220*b*, 225*b*, and a Reservation CEI is formed. The objects and the attributes they contain are defined as composite entity information for that entity. The objects 200*b*, 215*b* are referenced by a pointer termed as "doclet", which is the root of an entity's CEI and is directed to the parent object for each subset of objects. In the example provided, doclet RES1000 contains objects 200*b*, 205*b* and 210*b* and also contains doclet PRO2000 which, in turn, contains objects 215*b*, 220*b* and 225*b*. Object 200*b* is the parent object for the Reservation doclet RES1000 and Object 215*b* is the parent object for the Profile doclet PRO2000.

In the non-limiting example of FIGS. 2*a* and 2*b*, each object can contain one or more attributes. In the example of FIG. 2*b*, by way of explanation, the AOM schema contains a Reservation object having attributes ResID, Status, Arrival and Departure. An instance of this Reservation object is 200*b* having populated attributes ResID, Status, Arrival and Departure. It should be understood that as only one attribute is required for any object, enterprise systems could subscribe at the most granular level (e.g., a single attribute of an object) for an attribute in the AOM Likewise, the enterprise databases can publish at the most granular level an attribute to the AOM. Hence, the AOM is a superset of all the attributes that enterprise systems can publish or subscribe, and enterprise systems may publish or subscribe through sparsely populated instances of AOM.

Also, any attribute in the standard schemas that is not applicable to the enterprise at a current time could be preserved, which ensures that the AOM schema conforms to industry standards. Hence, any future systems that conform to the same industry standards are guaranteed to be compatible to the AOM schema. Also, there may be certain attributes relevant to some of the enterprise systems that may not be a part of the industry standard. In these cases, such attributes may be aggregated together in a separate object in the AOM schema or may be added to relevant objects of the industry standard. The AOM is also transparent to its publishing and subscribing systems since it hides the AOM schema and data access details.

As shown in the example of FIG. 2*b*, a document conforming to the Reservation AOM can be instantiated. It can then be populated with attributes for the Reservation object 200*b* with key PNR1234, and attributes for the child objects of RoomStay and ResOwner to form CEI for that Reservation entity. The newly created CEI is now available in the AOM for systems in the enterprise to publish and subscribe.

More specifically, as shown by the directional arrows in FIG. 2*a* the Reservation AOM schema contains all possible attributes that can be contained in a Reservation AOM. Also, any other AOMs for entities can be associated to the Reservation AOM, such as the Profile AOM. Since the Reservation doclet RES1000 (CEI of 200*b*, 205*b*, 210*b*) is associated with or shares the Profile doclet PRO2000 (CEI of 215*b*, 220*b*, 225*b*) this Reservation doclet inherits any changes to Profile doclet into its CEI by virtue of reference to the point of change. All Reservation doclets that share this Profile doclet, potentially several, observe this change immediately. As should be noted, though, any changes made to the Reservation doclet, in this example, will not be propagated to Profile CEI, as the directional arrows do not provide such functionality. This, however, can easily be accommodated by including the relevant associations in the AOM schema, namely directional arrows from Profile AOM to Reservation AOM.

Figure 3:
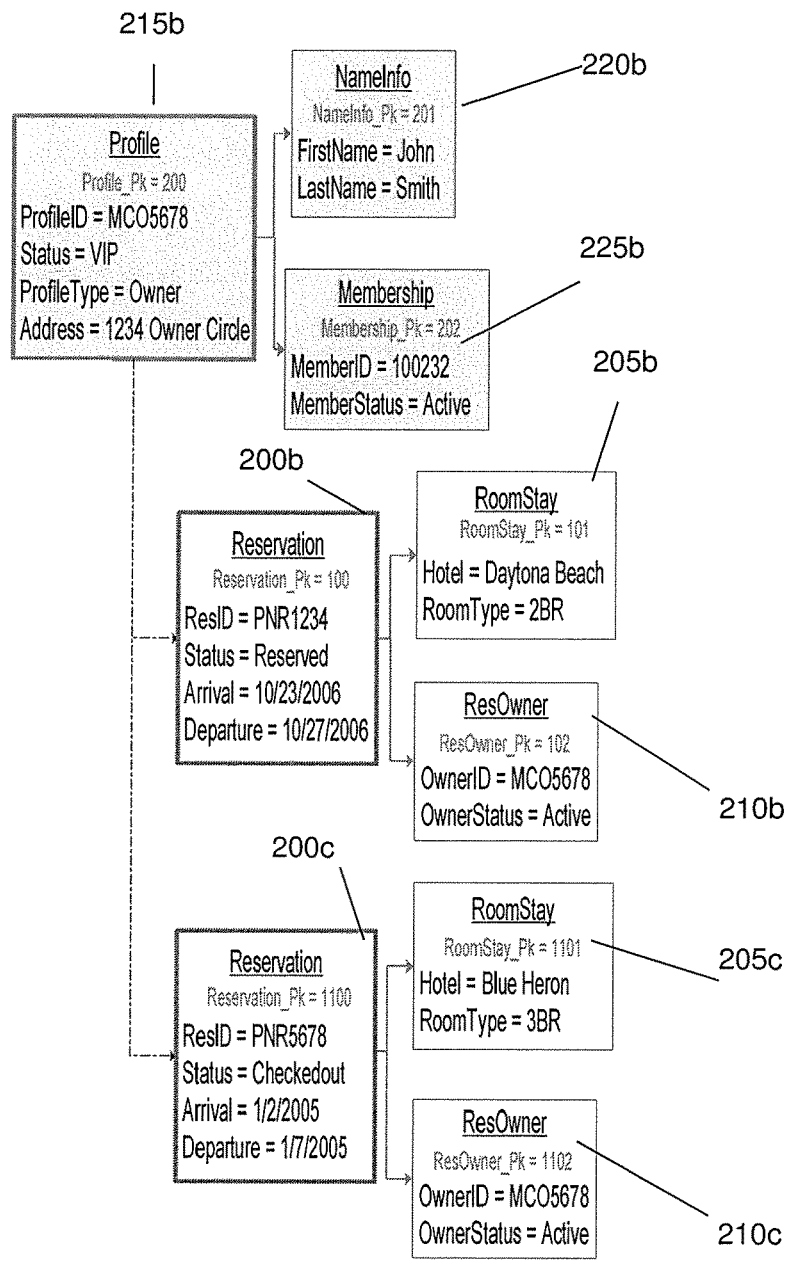
FIG. 3 is representative of a rearrangement of objects within the AOM in accordance with an aspect of the invention.

As shown in FIG. 3, the entities within the AOM can be rearranged as required for the publishing or subscribing system. The rearrangement of the entities allows different subscribing systems to customize their view of information. Comparing FIG. 2*b* to FIG. 3, in FIG. 3, the Profile doclet PRO2000 (CEI of 215*b*, 220*b*, 225*b*) is arranged to be the parent for Reservation doclets RES1000 and RES2000 (CEIs of 200*b*, 205*b*, 210*b* and 200*c*, 205*c*, 210*c* respectively). Note that in order for this rearrangement to be valid in the AOM schema, the relevant associations must be included in the AOM schema, namely directional arrows from Profile AOM to Reservation AOM. Comparatively, in FIG. 2*b*, the Reservation doclet RES1000 (CEI of 200*b*, 205*b*, 210*b*) is arranged to be the parent of Profile doclet PRO2000 (CEI of 215*b*, 220*b*, 225*b*) and hence any changes to the Profile doclet is propagated to the Reservation CEI The AOM is also extensible. For example,
  i) Attributes can be added to existing objects;
  ii) New objects can be added; and
  iii) One to one, one to many and many-to-many associations amongst the objects, specific to an enterprise system, can be accommodated in the same AOM schema. Illustrative of example (iii), in one enterprise system, one Profile AOM can be associated to one or many Reservation AOMs; while in another system, one Reservation AOM can be associated to one or many Profile AOMs.

Figure 4:
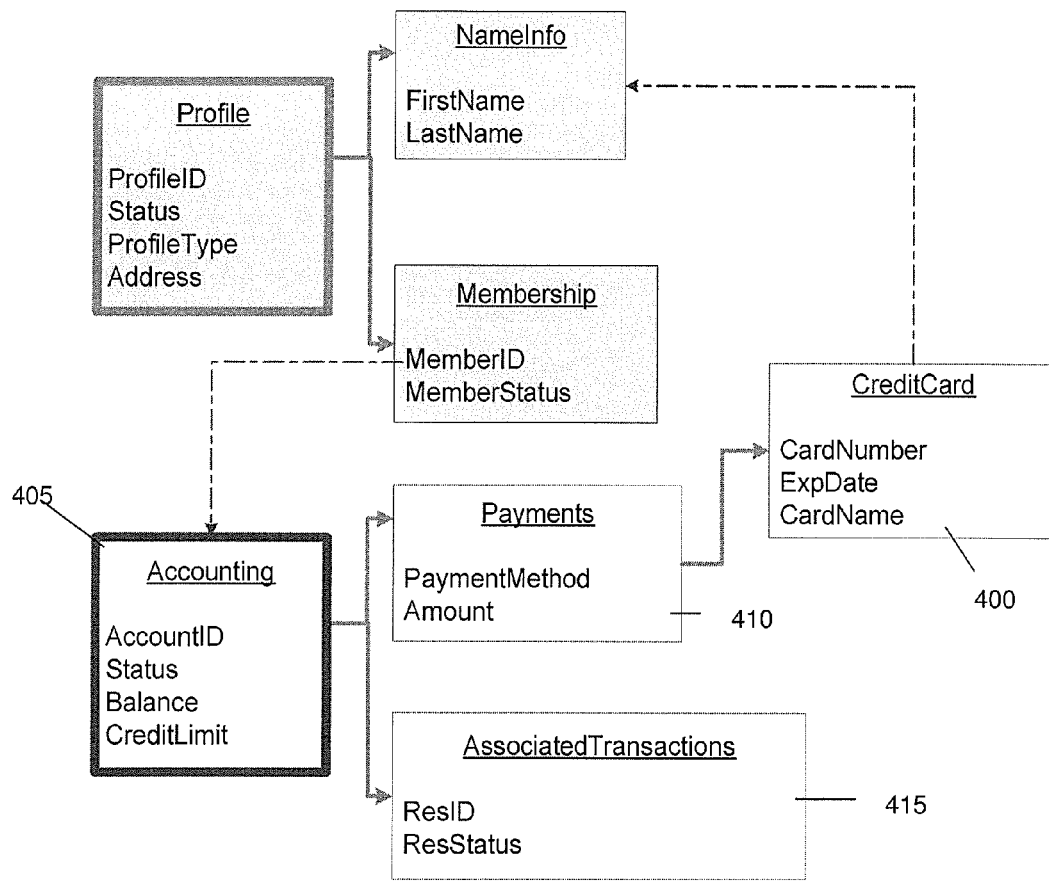
FIG. 4 shows an example of reusable objects in accordance with an aspect of the invention.

In addition, the objects in the AOM are reusable. For example, as shown in FIG. 4 the object Credit Card 400 reuses the established enterprise standard NameInfo. Also, as shown in FIG. 4, doclet ACC3000 is added that contains objects 405, 410 and 415. Object 405 is the parent object for the Accounting doclet ACC3000. In this example, Membership object 225*b* of the Profile doclet is associated (linked) with the Accounting doclet ACC3000.

Figure 5:
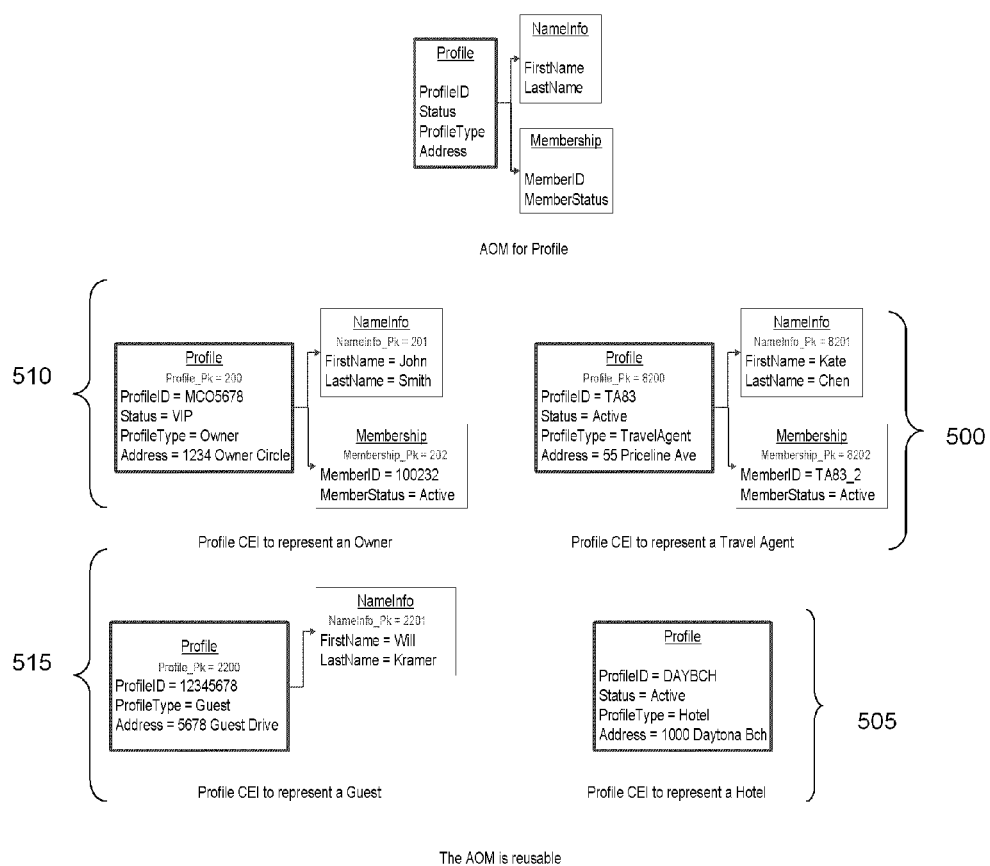
FIG. 5 shows the use of objects for different contexts from extending the base definition of an object in accordance with an aspect of the invention.

FIG. 5 shows the reuse of entities for different contexts. More specifically, the general Profile AOM with the associated objects can be used for a travel agent Doclet PRO0001 (500), hotel Doclet PRO0002 (505), owner Doclet PRO0003 (510) and/or guest Doclet PRO0004 (515), by changing the profile type. The different Profile AOM types can be identified by their keys, ProfileID and the qualifier, ProfileType. For exampleTravel Agent Doclet PRO0001 can be identified by key ProfileID=TA83 and ProfileType=TravelAgent and Hotel Doclet PRO0002 can be identified by key ProfileID=DAYBCH and ProfileType=Hotel. Thus, in accordance with aspects of the invention, information can be used in a different way, depending on the different profile types.

As shown illustratively in FIG. 5, it may be necessary to identify the attribute and object with a unique key, e.g., a name of the attribute and object in the AOM. It may also be necessary to specify the path of the attribute and object in the AOM in order to uniquely identify the object and attribute.

The attribute can be uniquely identified by an AOM attribute key, which is the name and path of the attribute as known in the AOM. For example, in the illustration in FIG. 5, the attribute ProfileID can be identified by Profile. ProfileID. In further embodiments, a system attribute key can identify the attribute, which is the name and path of the attribute as known in the publishing or subscribing system. (For example, a first subscribing system (Hotel Reservation Desk) can identify an attribute differently than a second subscribing system (the CRM system).) In the latter scenario, if the AOM client specifies a system attribute key, a mapping can be used to derive and plug-in the AOM attribute key. Hence, the AOM attribute key is the key which uniquely identifies an attribute in the AOM.

The attribute or collection of attributes that uniquely identifies the entity can be termed an entity key. It should be understood that the term entity key should not be considered a limiting feature to the claimed invention, and that other terms can equally be used within the scope of the invention. In embodiments, the entity(s) in the AOM can be uniquely identified by a system key, a global key and/or an AOM key.

The system key is an attribute or a collection of attributes that uniquely identifies the entities in the system that publishes or subscribes to the information. In embodiments, there may be two or more system keys, depending on the system publishing the information or subscribing to the information. In embodiments, the AOM can map any of the system keys to the entity, using known methods of mapping. In this manner, the AOM can identify an entity by the incoming key from a subscribing system.

A global key can uniquely identify the entity across the enterprise. In this implementation, each system will use the same global key to identify the entity. Thus, regardless of the subscribing system, all systems will send messages for a particular entity using the same key.

The AOM key is a key assigned to every uniquely identifiable entity by the AOM itself. As such, the AOM key uniquely identifies the entity across the enterprise. So, referring back to FIG. 2b, for example, the AOM key for the object Profile, may be "Profile_Pk=200", which can be used to uniquely identify the object across the enterprise.

In embodiments, the AOM includes two layers: a live AOM layer and a persistence AOM layer. The live AOM layer holds a run time compilation of a CEI for each entity. Thus, by using the entity key specified by the publishing or subscribing system, the AOM compiles the CEI for that object. This CEI is valid through the lifetime of the publishing or subscribing action. In embodiments, the publishing system updates the CEI held in the live AOM, and the live AOM then puts the entity change to the persistence AOM layer. In this manner, the live AOM can offer the subscribing systems the entity's comprehensive, enterprise-wide and real-time state.

The persistence AOM layer is a database to hold CEI data. The database can be an associative database containing data (attributes of the CEI), the links amongst the data (association of the objects in the CEI and of one CEI to another CEI) and associating enterprise systems to the CEIs of their interest. During the lifetime of a publishing or subscribing operation, the systems in the enterprise are oblivious as to whether they are operating on the live AOM layer or the persistence AOM layer due to the synchronization between the objects of the AOM and the database objects.

Figure 6:
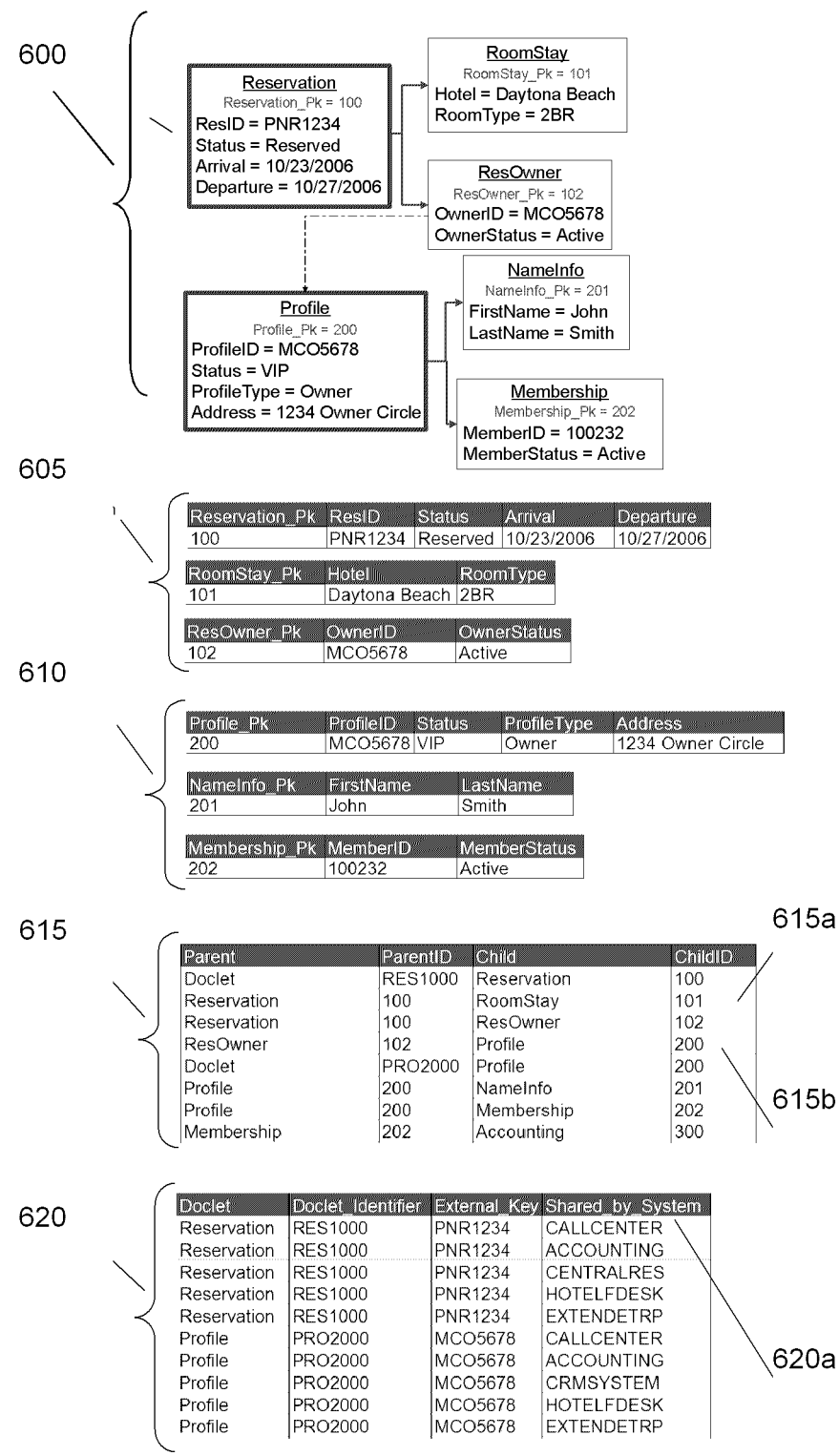
FIG. 6 shows a representative modeling of a "persistence AOM layer" in accordance with an aspect of the invention.

FIG. 6 shows a representative modeling of the persistence AOM layer. As represented in FIG. 6, the objects of the AOM offer persistence transparency to the publishing and subscribing systems. More specifically, for every object in the AOM schema, there exists a corresponding database object (table) in the persistence AOM layer, with the schemas of the AOM schema object and the persistence AOM object being compatible.

More specifically, in the representative depiction of FIG. 6, the persistence layer contains data, links amongst the data and the enterprise systems associating to the CEIs of their interest. By way of further explanation using one non-limiting example, a Reservation doclet and Profile doclet with associated children objects are shown at reference numeral 600. Directional arrows show the relationship (links) between the objects. The CEI for the Reservation doclet RES1000 is identified by key PNR1234.

The data of the Reservation doclet identified by PNR1234 and associated RoomStay and ResOwner objects are shown in a tabular format at reference numeral 605. The CEI for Profile doclet is identified by key MCO5678 and is shown with its associated objects NameInfo and Membership at reference numeral 610.

The links amongst the doclets and objects shown at reference numeral 600 are provided in tabular format at reference numeral 615. By way of example, the line identified by 615a shows that the RoomStay table record with the primary key 101 is a child object to the Reservation table record with the primary key 100. As another example, the line identified by reference numeral 615b indicates that the profile CEI with entity key PRO2000, the CEI root at Profile table with the primary key 200, is a child to the ResOwner table record with the primary key 102. Also, indirectly, the Profile CEI with the entity key PRO2000 is a child to Reservation CEI with entity key RES1000.

Moreover as shown at reference numeral 620, an association is made between the enterprise systems and the CEIs. For example, Reservation CEI with global key PNR1234 or AOM key RES1000 is associated or shared by the Call Center Application. Similarly, the same Reservation CEI is shared by the Accounting, Central Reservation, Hotel Front Desk and Extended Enterprise Systems. This allows different systems within the enterprise to share the same entities, objects and attributes.

Figure 7:
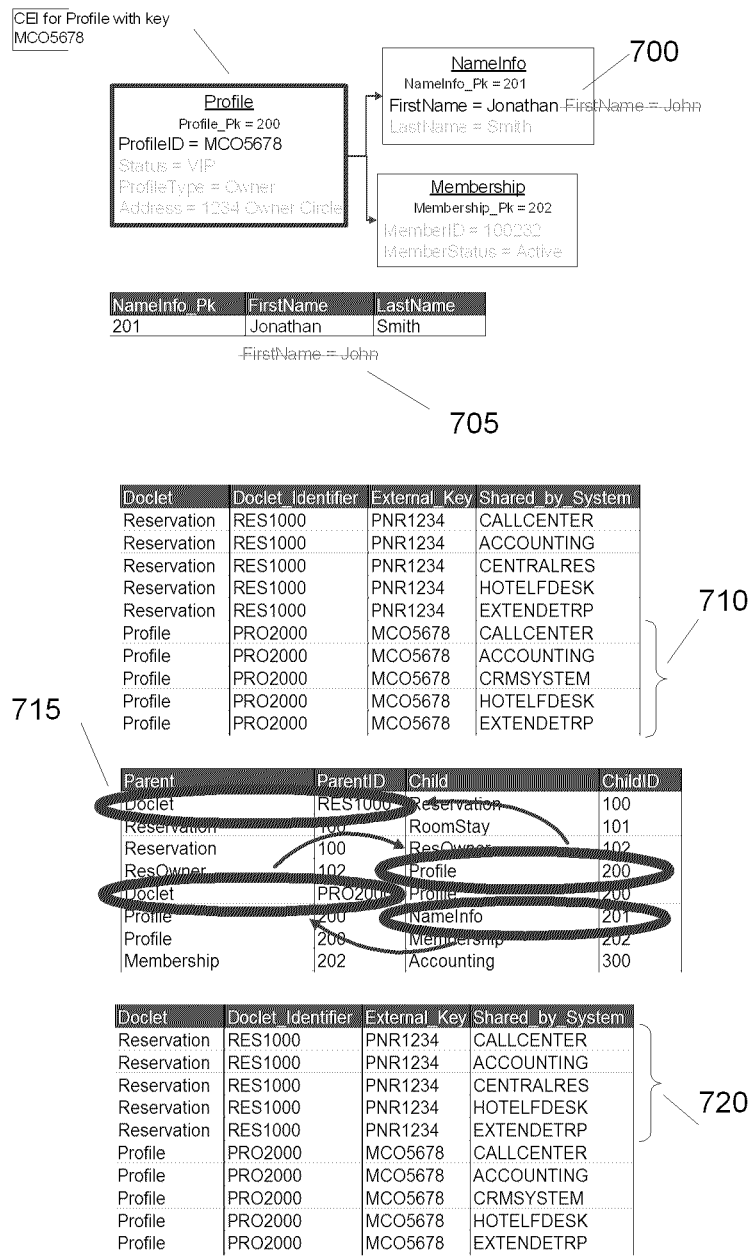
FIG. 7 is representative of a propagation of changes throughout an enterprise in accordance with an aspect of the invention.

FIG. 7 shows an illustrative example of a propagation of changes throughout the enterprise in accordance with the invention. As shown in FIG. 7, the links amongst the silos of data are maintained such that any change to the entity in any of the enterprise databases affects the CEI comprehensively. Basically, this is because any change in the enterprise is propagated through the AOM by virtue of reference to the point of change. Hence, any system that may have subscribed for the attribute that changed, or the object that contains the attribute that changed, or the objects that share the object that contains the attribute that changed, by virtue of reference have inherited the change to the composite information on that object.

More specifically, FIG. 7 shows an example of a CEI for the Profile doclet with an identification key of MCO5678. In this example, the CRM system 700 publishes a change to a guest's name from John to Jonathan. This name change causes an update in a single location in the persistence AOM layer 705. As shown at reference numeral 710, the Call Center, Accounting, CRM System, Hotel Desk and the Extended Enterprise systems are associated with and share the Profile CEI with an identification key of MCO5678. As this is the case, the Call Center, Accounting, CRM System, Hotel Desk and the Extended Enterprise systems will immediate observe the data change to the Profile CEI as provided by the CRM system 700.

As shown in table 715, as the Reservation doclet with the key RES1000 is associated with or shares the CEI with key PRO2000, the Reservation doclet will inherit the change to the Profile doclet into its CEI by virtue of reference to the point of change. All Reservation CEIs that share the Profile CEI, potentially several, will all share in this change.

Similar to that show in table 710, table 720 shows that the Call Center, Accounting, CRM System, Hotel Desk and the Extended Enterprise systems are associated with and share the CEI of Reservation doclet RES1000. As the Reservation doclet RES1000 and Profile doclet PRO2000 are linked, the Call Center, Accounting, CRM System, Hotel Desk and the Extended Enterprise Systems will immediately observe the data change to the Reservation doclet as provided to the Profile doclet by the CRM system 700.

Figure 8:
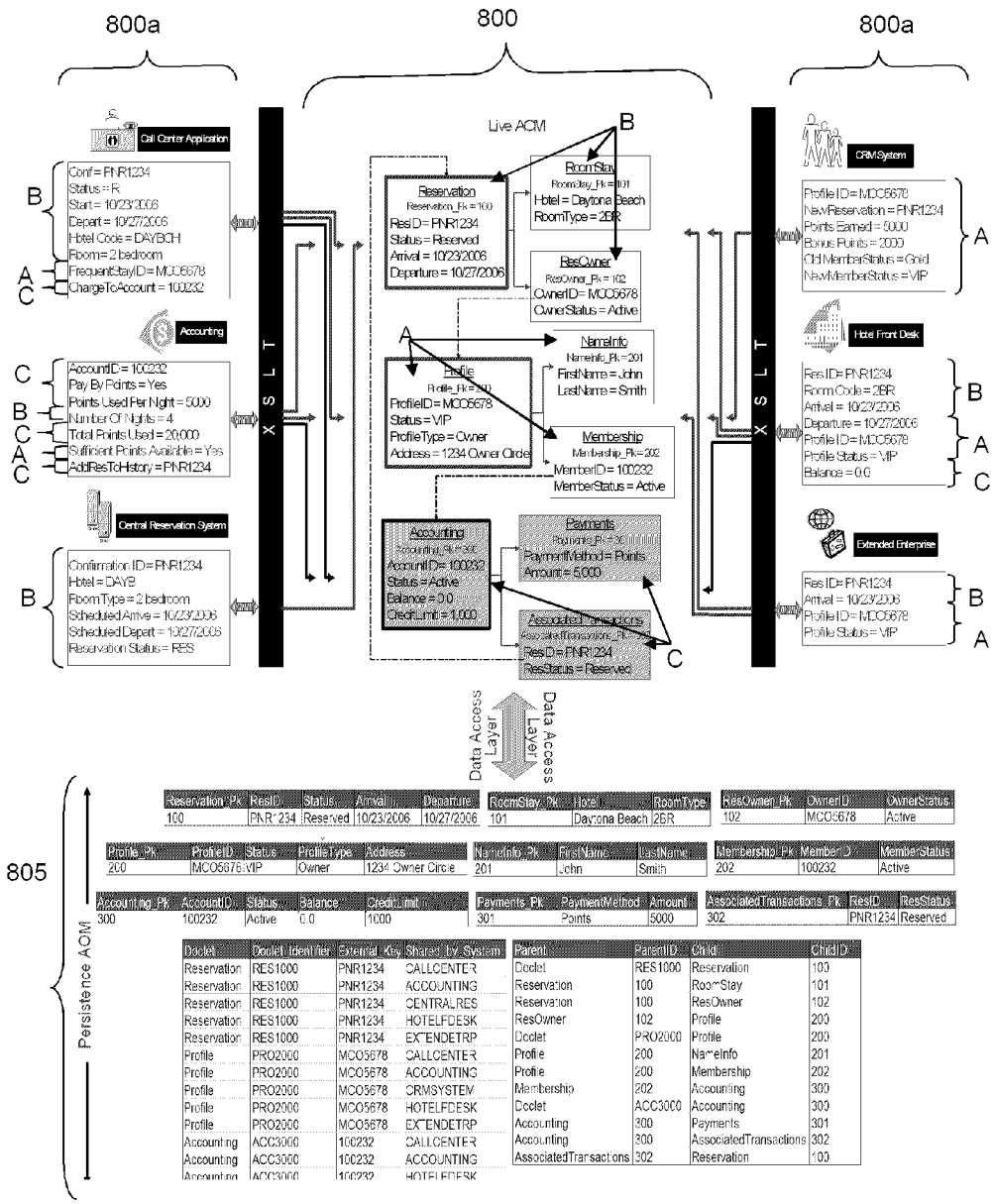
FIG. 8 shows an overview of an example implementing aspects of the invention.

FIG. 8 shows an overview of an example implementing aspects of the invention. In FIG. 8, the AOM is represented at reference numeral 800 and subscribers and publishers of information are represented at reference numeral 800a. Although any number of different subscribers and publishers are contemplated by the invention, depending on the industry, FIG. 8 shows, for example, a CRM system, a Hotel Front Desk, an Extended Service Enterprise, a Call Center Application, Accounting and Central Reservation System.

The subscribers and publishers each subscribe and publish information to objects in CEIs with attributes, respectively. For example, the CRM subscribes to a Profile entity identified by entity key MCO5678 and a Reservation entity identified by entity key PNR1234. In this manner, the CRM can see any changes made to the Profile entity and/or Reservation entity, for example, and any related or associated entities and objects as such changes propagate through the AOM.

The messages from the subscribers and publishers each include attribute information associated with each of the published or subscribed entity, represented by "A", "B" and "C". In the illustrative example of FIG. 8, "A" represents Profile entity and related attributes, "B" represents Reservation entity and related attributes and "C" represents Accounting entity and related attributes. In the example of publishing, as described herein, any attribute related to an identified entity, e.g., entity and related attributes associated with "A", can be changed which, in turn, will propagate to related or associated entities. In embodiments, the system and method of the invention will map the messages between the subscribing and publishing system to the AOM and vice versa, using known mapping techniques.

In embodiments, an XSLT (Extensible Stylesheet Language Transformations) layer can transform data from the publishing and subscribing systems to the appropriately identified objects in the AOM layer 800, using the unique identification keys in mapping methods known to those of skill in the art. As should be understood by those of skill in the art, XSLT is an XML-based language used for the transformation of XML documents. XSLT is designed to transform XML documents into other XML or "human-readable" documents. In one contemplated embodiment, the original document is not changed; rather, a new document is created based on the content of an existing one. The new document may be serialized (output) by the processor in standard XML syntax or in another format, such as HTML or plain text.

In the example of FIG. 8, the Call Center Application can change a start date or a depart date for Reservation entity identified by key PNR1234. As the directional arrows show, the start date and the depart date can then be updated throughout the entire AOM. In this example, the Hotel Front Desk subscribing system can then view this change in the live AOM, without the need for processing every change to each of the related objects; as such objects have already undergone a change of attribute information in the AOM.

The persistence AOM layer 805 shows the links (relationships) between the Reservation entity (RES1000) and the subscribing and publishing systems, as well as the link between each of the CEIs and then the objects within the CEIs. The persistence AOM layer 805 also shows the links between the remaining subscribers and publishers. In embodiments, the publishing system updates the CEI held in the live AOM, and the live AOM then puts the entity change to the persistence AOM layer. In this manner, the objects of the AOM and the database objects are synchronized.

While the invention has been described in terms of embodiments, those skilled in the art will recognize that the invention can be practiced with modifications and in the spirit and scope of the appended claims.

What is claimed:

1. A method comprising:
providing a first entity type by associating data relating to an entity from a plurality of databases to represent a comprehensive state of the entity;
providing composite entity information (CEI) for the first entity type, the composite entity information comprising:
one or more objects in the first entity type; and
one or more attributes for each of the one or more objects;
providing at least one link through a pointer between the first entity type and one or more related or associated entity types;
associating at least one enterprise system subscriber to at least one of: the first entity type and the one or more related or associated entity types;
providing a persistence database in a persistence associative object model (AOM) layer comprising the one or more attributes, the at least one link between the first entity type and the one or more related or associated entity types, and the at least one enterprise system subscriber;
updating a change to data of the one or more attributes in a single location in the persistence database;
inheriting the change to the data of the one or more attributes of the first entity type and the linked one or more related or associated entity types in an active AOM accessible by a subscribing system and a publishing system in an enterprise;
identifying the first entity type by a unique key which comprises a system key which is an attribute that uniquely identifies entities that publish or subscribe to information, a global key which uniquely identifies the entity across the enterprise, and an AOM key which is assigned to every uniquely identifiable entity by the AOM;
subscribing the at least one enterprise system subscriber to the first entity type and the one or more related or associated entity types; and
providing the at least one link between the first entity type and the one or more related or associated entity types provides the at least one enterprise system subscriber with the ability to customize their view of the data,
wherein the at least one system subscriber is a member of at least one of the subscribing system and the publishing system, and the active AOM receives the change to the data of the one or more attributes from the at least one system subscriber to immediately propagate the change to the data of the one or more attributes to the one or more related or associated entity types of the first entity type,
wherein the change to the data of the one or more attributes is inherited through the active AOM by virtue of reference to a point of change through the pointer such that the change to the data of the one or more attributes is immediately observed in a master view and the at least one enterprise system subscriber associated with the at least one of: the first entity type and the one or more related or associated entity types inherits the change to the data of the one or more attributes by virtue of the reference to the point of change through the pointer and can observe the change to the data of the one or more attributes in the master view, wherein the change to the data of the one or more attributes of the one or more objects, is inherited through the at least one link, which describes associations between the one or more objects, associations of the pointer between the first entity type and the one or more related or associated entity types, and associations between the subscribing system and the publishing system and other subscribing systems and publishing systems in the enterprise between the linked entity types in the active AOM, wherein the AOM comprises a live AOM layer which includes a run time compilation of the CEI for the first entity type and the one or more related or associated entity types and the persistence AOM layer which includes a database containing CEI data, wherein the CEI is valid for a lifetime of a publishing action or a subscribing action, wherein the at least one link between the first entity type and the one or more related or associated entity types is rearranged by the at least one enterprise system subscriber in order to customize associations between the first entity type and the one or more related or associated entity types and a corresponding view of the first entity type and the one or more related or associated entity types, and wherein the at least one link between the first entity type and the one or more related or associated entity types is further rearranged by the at least one enterprise system subscriber by changing directional arrows between the first entity type and the one or more related or associated entity types in the AOM.

2. The method of claim 1, wherein:
the change to the data of the one or more attributes of the first entity type changes the composite entity information of the first entity type and of the to one or more related or associated entity types;
the change to the data of the one or more attributes of the first entity type in any database of the enterprise affects the composite entity information comprehensively in the one or more related or associated entity types; and
the one or more related or associated entity types are configured to inherit changes therebetween.

3. The method of claim 1, wherein:
any of the first entity type and the one or more related or associated entity types are reusable; and
any of the one or more objects in the first entity type and the one or more related or associated entity types are reusable.

4. The method of claim 1, further comprising:
adding the one or more attributes to the first entity type or the one or more related or associated entity types;
adding new entity types; and
making at least one of one to one, one to many and many-to-many associations amongst different entity types in a same AOM schema.

5. The method of claim 1, further comprising providing a computer infrastructure that performs the steps of claim 1 and is created, deployed, maintained and supported by a service provider.

6. The method of claim 1, further comprising preserving the one or more attributes in the active AOM.

7. The method of claim 1, wherein the data is transformed from the subscribing system and the publishing system to the active AOM.

8. The method of claim 1, wherein the active AOM is configured to publish a single, synchronized and integrated master view of any data change to at least the first entity type.

9. The method of claim 1, wherein the active AOM is oblivious of an underlying industry specific schema such that the AOM spawns across multiple organizations with different industry standards.

10. The method of claim 1, further comprising:
creating a plurality of entity types by creating associations between parent objects and child objects of the active AOM, the plurality of entity types including the first entity type and the one or more related or associated entity types;
creating a plurality of associations between enterprise systems and the plurality of entity types so that composite entity information (CEI) of the plurality of entity types is linked to the enterprise systems; and
updating CEI of the first entity type in the live AOM layer with the change to the data of the one or more attributes;
putting the entity change in the persistence AOM layer via the live AOM layer, wherein putting the entity change in the persistence AOM layer inherits the change to the data of the one or more attributes.

11. The method of claim 1, wherein:
the change to the data of the one or more attributes is made in the live AOM layer and replicated in the persistence AOM layer based on a direct correlation between the live AOM layer and the persistence AOM layer; and
replicating the change in the persistence AOM layer inherits the change to the data of the one or more attributes between the linked entity types through the pointer.

12. The method of claim 1, wherein a plurality of entity types comprise the first entity type and the one or more related or associated entity types, and the subscribing the at least one enterprise system subscriber comprises the at least one enterprise system subscriber subscribing to at least one of or a combination of the plurality of entity types.

13. The method of claim 1, wherein:
the data comprises the one or more attributes of the first entity type;
the active AOM is a superset of all of the one or more attributes that the subscribing system and the publishing system can subscribe to or publish; and
the at least one enterprise system subscriber subscribes to any number of the one or more attributes associated with the first entity type and the one or more related or associated entity types that are subscribed to by the at least one enterprise system subscriber.

14. The method of claim 1, wherein the one or more objects are referenced by the pointer, which is a root of the comprehensive state of the entity, and each of the one or more objects comprises the one or more attributes.

15. The method of claim 1, wherein the unique key further comprises a name of the one or more objects, a name of the one or more attributes for each of the one or more objects, and a path of the one or more objects and the one or more attributes.

16. The method of claim 1, further comprising an extensible stylesheet language transformation layer which transforms data from the publishing system and the subscribing system to the data of the one or more attributes in the active AOM using the unique key and outputs a new document in HTML format based on the transformed data.

17. The method of claim 1, wherein the AOM maps the system key to the entity, and each of the one or more objects has a corresponding database object in the persistence AOM layer.

18. A computer program product comprising a non-transitory computer usable readable memory or device having readable program code embodied in the memory or device, the computer program product includes at least one component to:
- provide a first entity type by associating data relating to an entity from a plurality of databases to represent a comprehensive state of the entity;
- provide composite entity information (CEI) for the first entity type, the composite entity information comprising:
  - one or more objects in the first entity type;
  - one or more attributes for each of the one or more objects; and
- provide at least one link through a pointer between the first entity type and one or more related or associated entity types;
- associate at least one enterprise system subscriber to at least one of: the first entity type and the one or more related or associated entity types;
- provide a persistence database in a persistence associative object model (AOM) layer comprising the one or more attributes, the at least one link between the first entity type and the one or more related or associated entity types, and the at least one enterprise system subscriber;
- updating a change to data of the one or more attributes in a single location in the persistence database;
- inherit the change to the data of the one or more attributes of the first entity type and the linked one or more related or associated entity types in an active AOM accessible by a subscribing system and a publishing system in an enterprise;
- identify the first entity type by a unique key which comprises a system key which is an attribute that uniquely identifies entities that publish or subscribe to information, a global key which uniquely identifies the entity across the enterprise, and an AOM key which is assigned to every uniquely identifiable entity by the AOM;
- subscribe the at least one enterprise system subscriber to the first entity type and the one or more related or associated entity types; and
- provide the at least one link between the first entity type and the one or more related or associated entity types further provides the at least one enterprise system subscriber with the ability to customize their view of the data, wherein the at least one system subscriber is a member of at least one of the subscribing system and the publishing system, and the active AOM receives the change to the data of the one or more attributes from the at least one system subscriber to immediately propagate the change to the data of the one or more attributes to the one or more related or associated entity types of the first entity type, wherein the change to the data of the one or more attributes is inherited through the active AOM by virtue of reference to a point of change through the pointer such that the change to the data of the one or more attributes is immediately observed in a master view and the at least one enterprise system subscriber associated with the at least one of: the first entity type and the one or more related or associated entity types inherits the change to the data of the one or more attributes by virtue of the reference to the point of change through the pointer and can observe the change to the data of the one or more attributes in the master view, wherein the change to the data of the one or more attributes of the one or more objects, is inherited through the at least one link, which describes associations between the one or more objects, associations of the pointer between the first entity type and the pointer of the one or more related or associated entity types, and associations between the subscribing system and the publishing system and other subscribing systems and publishing systems in the enterprise between the linked entity types in the active AOM, wherein the AOM comprises a live AOM layer which includes a run time compilation of the CEI for the first entity type and the one or more related or associated entity types and the persistence AOM layer which includes a database containing CEI data, wherein the CEI is valid for a lifetime of a publishing action or a subscribing action, wherein the at least one link between the first entity type and the one or more related or associated entity types is rearranged by the at least one enterprise system subscriber in order to customize associations between the first entity type and the one or more related or associated entity types and a corresponding view of the first entity type and the one or more related or associated entity types, and wherein the at least one link between the first entity type and the one or more related or associated entity types is further rearranged by the at least one enterprise system subscriber by changing directional arrows between the first entity type and the one or more related or associated entity types in the AOM.

* * * * *